United States Patent [19]

de Nagybaczon

[11] 4,275,104

[45] Jun. 23, 1981

[54] DRY TRANSFER SYSTEM

[75] Inventor: Erno N. de Nagybaczon, Montreal, Canada

[73] Assignee: International Hona NV, Bonaire, Netherlands Antilles

[21] Appl. No.: 41,664

[22] Filed: May 23, 1979

[30] Foreign Application Priority Data

May 31, 1978 [GB] United Kingdom ............... 24832/78

[51] Int. Cl.[3] .......................... B41M 3/12; B44C 1/16; B32B 3/18

[52] U.S. Cl. .................................... 428/195; 156/234; 156/240; 156/249; 156/277; 427/146; 427/152; 427/261; 427/290; 428/336; 428/339; 428/421; 428/422; 428/480; 428/914; 430/11; 430/14; 430/18; 430/965

[58] Field of Search ............... 156/230, 234, 239, 240, 156/241, 249, 277; 427/146, 147, 290, 152, 256, 261; 428/421, 422, 483, 914, 195, 206, 207, 336, 339, 480; 430/11, 14, 18, 105, 109, 111, 965

[56] References Cited

U.S. PATENT DOCUMENTS

| | | | |
|---|---|---|---|
| 3,343,976 | 9/1967 | Matlock | 427/290 |
| 3,413,137 | 10/1968 | Chebiniak et al. | 428/421 X |
| 3,434,861 | 3/1969 | Luc | 156/240 |
| 3,519,456 | 7/1970 | Reed et al. | 156/240 X |
| 3,616,176 | 10/1971 | Jachinowicz | 156/240 X |
| 3,922,438 | 11/1975 | Brown et al. | 428/422 X |
| 3,933,503 | 1/1976 | Schönberg | 428/422 X |
| 4,066,802 | 1/1978 | Clemens | 156/230 X |

*Primary Examiner*—Bruce H. Hess

*Attorney, Agent, or Firm*—Steele, Gould & Fried

[57] ABSTRACT

A dry transfer system for transferring indicia to a receiving surface comprises a flexible but dimensionally stable carrier substrate with a film of cohesive, pliable and plastically deformable, indicium-forming material not more than 10 micrometers thick defining a preformed image and adhering to the front surface of the substrate. This surface is composed of a smooth material with adhesive properties such that without relying on adhesive the film can be released and transferred to a receiving surface in close contact, by a pressure transmitted through the substrate, but the film is retained on the carrier substrate in the absence of such pressure, in spite of close contact with the receiving surface.

26 Claims, 1 Drawing Figure

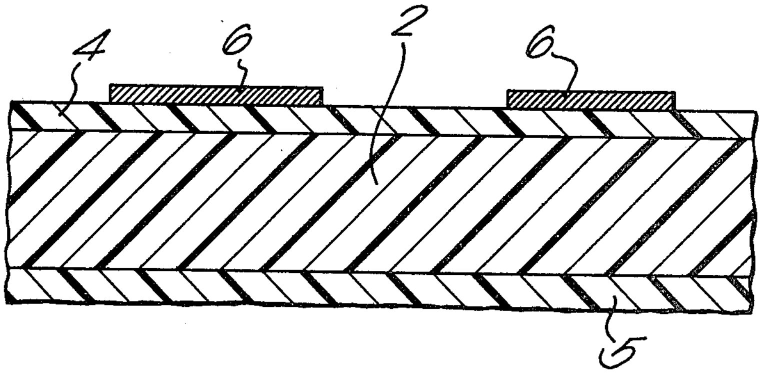
4
6
2
6
5

DRY TRANSFER SYSTEM

The present invention relates to a dry transfer system and to a method of producing the said dry transfer system.

In the specification, the term "dry transfer" means any process which enables transfer of an indicium-forming material from a carrier substrate to a receiving surface to form an "indicium" (i.e. one or more letters, numerals, designs, plans, etc) on the receiving surface.

The indicium-forming material conventionally includes a colouring material such as an ink and either additionally includes an adhesive or alternatively the adhesive is provided on the receiving surface.

The term "dry transfer system" as used herein means a composite material including a carrier substrate (i.e. a sheet which bears the indicium-forming material), the indicium-forming material and any other layer which may be present.

Conventional dry transfer systems (of which there are a number and the most important of which are produced by silk-screen or photo-mechanical processes) have at least three basic elements common to them:

(a) a carrier substrate which can be paper, a polymeric film (e.g. cellulose acetate, cellulose triacetate, polystyrene, a polycarbonate, a polyester, polyethylene or polypropylene) or a non-porous flexible sheet material, which carrier substrate either carries the preformed indicium by virtue of any of the above mentioned processes or is coated on one of its sides with a substance capable of forming an image on a receiving surface through the application of either heat or pressure, and (b) the indicium-forming material, which material includes the indicium itself or a substance, such as an ink, capable of forming it, and (c) an adhesive which is either incorporated within the indicium-forming material or is coated on the receiving surface and which, whether it is activated by heat, pressure, moisture or solvent, or, for example, micro-encapsulated, is capable of creating a bond between the receiving surface and the indicium (howsoever formed), which bond is greater than the bond existing between the indicium and the carrier substrate.

One problem common to such dry transfer systems is the release quality of the carrier substrate. Since every material has surface irregularities to a lesser or greater degree, the indicium-forming material which is applied to it in a liquid state enters the surface cavities of the material and forms a mechanical bond with it upon drying. The greater the bond between the indicium-forming material and the carrier substrate the more difficult is the release. To overcome this problem some well known dry transfer systems employ the following solutions:

(a) by employing as the carrier substrate, a dimensionally unstable material which, on application of pressure thereto, stretches laterally, thereby effecting release between the indicium-forming material and the carrier substrate, and/or (b) by forming the carrier substrate by coating a base sheet with, for example, a wax, a water soluble polymer (e.g. gelatin), or a lacquer which coating serves to reduce the surface free energy of the carrier substrate and thereby reduce the strength of the bond between the carrier substrate and the indicium-forming material to enable transfer of an indicium to a receiving surface.

However, the above solutions to the release difficulties incur problems of their own. Thus, when adopting solution (a), the lateral stretching of the carrier substrate tends to be accompanied by the distortion of the indicium.

Similarly, problems are encountered when using the conventional coatings referred to above when adopting solution (b). Thus, the release characteristics of wax vary with temperature and those of water soluble polymers with humidity. On the other hand, if a lacquer is employed, then although the bond between carrier substrate and indicium-forming material is reduced, thereby, the mechanical bond is still too strong to enable easy release of the indicium during the transfer process.

Another disadvantage with conventional dry transfer systems is that efficient release and transfer to a receiving surface can be achieved only if an adhesive material is applied either on the carrier substrate or receiving surface as previously mentioned so that one of these surfaces must be tacky, thus presenting handling and storage problems.

In addition, the application of the adhesive requires, in the manufacture of the dry transfer system, either a separate adhesive application step to provide the two separate layers of ink composition and adhesive respectively or the incorporation of the adhesive in the ink composition to produce a single layer of indicium-forming material, which latter procedure requires still further processing steps to produce an image on the carrier substrate for transfer as later described.

A disadvantage also arises because, after transfer, an excess of adhesive tends to cover regions of the receiving surface out of register with the indicia, this being particularly so in regions immediately surrounding the indicia. Adhesive in such regions may be unsightly and in any case tends to attract dirt and prevents further writing on the receiving surface in those regions. A similar problem arises when a waxy substance is present as a coating on the base sheet (an example of solution (b) above) or as a component of the indicium-forming material.

A further disadvantage is that the ink composition which provides the indicium-forming material must be capable of forming a polymeric film which is thick and robust and which therefore provides a coating which is sufficiently strong to prevent either (i) tearing or deformation of the indicium during release from the carrier substrate or (ii) penetration of the indicium-forming material back into the interstices of the carrier substrate on application of pressure thereto during transfer (which penetration would increase rather than decrease the strength of the bonding between the indicium-forming material and carrier substrate thus making transfer more difficult or impossible). To provide the necessary robustness, substantial quantities of the ink composition are generally required because, conventionally, increased robustness is attained by increasing the thickness of the coating of the ink composition.

A further disadvantage is that in some dry transfer systems the base sheet, or the coating conventionally applied to the base sheet to reduce the surface free energy of the resultant carrier substrate and thus reduce the bond between carrier substrate and indicium-forming material to enable dry transfer to take place, is incompatible with many of the ink compositions which would otherwise be useful for providing the indicium-forming material. For example, the base sheet or the coating thereon (when adopting solution (b) referred to above) may be either deformed (e.g. swollen) by or dissolved by the solvent of the ink composition.

A still further disadvantage with conventional dry transfer systems is that difficulties may be encountered when attempting to apply a desired configuration of indicium-forming material on to a carrier substrate, particularly when an intricate design or a design of accurate dimensions is to be applied. One such difficulty lies in accurately applying the large quantities of ink composition required to give a coating of sufficient robustness and another such difficulty lies in accurately applying a subsequent layer of adhesive so as to lie in register with the coating of ink composition and thus minimize the disadvantage referred to above concerning excess adhesive. These difficulties present such problems that for printing or intricate designs or designs of particularly high accuracy of dimension, techniques have been employed by which the entire surface is coated with ink composition and adhesive and thereafter with a hardenable resist material, accurately selected portions of the resist then being hardened and the remainder, together with the ink and adhesive thereunder, being washed off to leave the desired image covered with a layer of hardened resist, this layer being subsequently removed by chemical or mechanical means. Such techniques have also been conventionally employed when forming, for example, dry transfer systems including a single layer of ink and adhesive combined as indicium-forming material.

These techniques are, however, complicated, time-consuming and expensive in both labour and wasted materials.

Yet another disadvantage is that carrier substrates bearing the indicium-forming material can only be stacked one above the other if a protective interleaf is placed therebetween so as to prevent the indicium-forming material accidentally transferring from one carrier substrate surface to another.

The above mentioned problems concerning release quality and presence of adhesive can be overcome by using a dry transfer system within the invention.

In addition, the above mentioned interleaves may be dispensed with when using certain dry transfer systems embodying the invention.

According to the invention I provide a dry transfer system for transferring indicia therefrom to a receiving surface, comprising (a) a flexible carrier substrate having front and rear surfaces and (b) a film of indicium-forming material defining a preformed image and adhering to at least a portion of the front surface of the carrier substrate, wherein: the film of indicium-forming material is cohesive, pliable, extensible, and not more than 10 micrometers in thickness;

the carrier substrate is dimensionally stable, and at least the front surface of the substrate is composed of a material whose surface possesses abhesive properties and is sufficiently smooth, that when no adhesive is present, or without relying on adhesive, (A) the carrier substrate is nevertheless capable of releasing the film of indicium-forming material to a receiving surface in close contact therewith on application, to the rear surface of the carrier substrate, of a pressure transmissible through the carrier substrate to deform the film so that this film intimately conforms to the receiving surface and remains transferred thereto, but (B) the carrier substrate is still capable of retaining said indicium-forming material adherent to the front surface of the carrier substrate when in said close contact with the receiving surface in the absence of said pressure.

By "extensible", I mean that the material is capable of plastic deformation.

The carrier substrate is capable of fulfilling the abovementioned criteria (A) and (B) by virtue of the nature of its surface bearing the indicium-forming material. A material having a surface of suitable abhesive properties (suitably low surface free energy) is used as the carrier or as a coating on the carrier, to provide this substrate surface; and if this surface is smooth enough or is rendered smooth enough, (and is sufficiently uniform on the macro scale) it is found to fulfil criteria (A) and (B) when the film of indicium-forming material is not more than 10 micrometers thick, preferably 0.5 to 5 micrometers thick. The criteria apply only when there is no adhesive present, but the invention extends to cases where the same substrate, which meets these criteria in the absence of adhesive, is used in the presence of adhesives, e.g. in the indicium-forming material.

The invention also provides a method of producing a dry transfer system for transferring indicia therefrom to a receiving surface, by applying a film of indicium-forming material defining a preformed image to at least a portion of the front surface of a flexible carrier substrate having front and rear surfaces, comprising the steps of:

(i) providing a carrier substrate which is dimensionally stable, and at least the front surface of which is composed of a material whose surface possesses abhesive properties and is sufficiently smooth, that when cohesive, pliable and extensible indicium-forming material of a thickness no greater than 10 micrometers has been applied and is adherent thereto, and when no adhesive is present, (A) the carrier substrate is nevertheless capable of releasing the film of indicium-forming material to a receiving surface in close contact therewith on application, to the rear surface of the carrier substrate, of a pressure transmissible through the carrier substrate to deform the film so that this film intimately conforms to the receiving surface and remains transferred thereto; but (B) the carrier substrate is still capable of retaining said indicium-forming material adherent to the front surface of the carrier substrate when in said close contact with the receiving surface in the absence of said pressure; and (ii) applying to at least a portion of said front surface of the carrier substrate a cohesive, pliable, extensible film not more than 10 micrometers thick, of indicium-forming material defining a preformed image.

In order for the bond of adherence between the front surface of the carrier substrate and the indicium-forming material to be sufficiently easily breakable to enable efficient transfer to a receiving surface, the said front surface must be sufficiently smooth to prevent the indicium-forming material from being held by the front surface during the transfer process. Thus although the front surface may be undulating it must not contain regions which are sufficiently rough as to present crevices which would permanently trap the indicium-forming material thus preventing transfer or causing tearing of indicia. In general, I find that most substrates which would otherwise be useful as carrier substrates do not have a surface sufficiently smooth or compact as to render the substrate capable of use as a carrier substrate in a dry transfer system. However, I find that certain substrates are sufficiently compact and can be rendered sufficiently smooth as to be capable of use as a carrier substrate by subjecting them to a simple smoothing operation, for example, buffing. Such substrates include those made of a copolymer, known as FEP, containing units derived from hexafluoropropylene and tetrafluoroethylene and base sheets at least one surface of which is coated with a dispersion of a fluorocarbon compound (hereinafter called a fluorocarbon dispersion) which is preferably a polymer and/or telomer containing units derived from tetrafluoroethylene and more preferably a polytetrafluoroethylene homopolymer and/or homotelomer (hereinafter called a PTFE dispersion). When such coated base sheets are employed the buffing is preferably carried out after a predetermined time interval from application of the PTFE dispersion to the base sheet, after which time interval the coating has become sufficiently hard or tough not to be damaged but is still sufficiently soft or plastic to enable removal of protruding material imparting the undesirable roughness by the buffing operation.

In addition I find that the abovementioned substrates are sufficiently compact at the front surface thereof which is to carry the indicium-forming material to prevent even the thinnest layers thereof from penetrating back into the substrate on application of pressure to the rear surface thereof during transfer.

An increased efficiency of transfer is attained when using a dry transfer system embodying the invention; this is because the front surface of the carrier substrate bearing the indicium-forming material has (i) a degree of smoothness such that the strength of the mechanical bond between the indicium-forming material and the carrier substrate is sufficiently strong to hold the material thereon prior to use in a dry transfer process and yet sufficiently weak to enable easy release of the indicium during transfer and (ii) a sufficiently compact structure that penetration of even the thinnest layer of indicium-forming material back into the carrier substrate on application of pressure is prevented thus maintaining the said mechanical bond sufficiently weak during transfer to enable easy release of the indicium. Because of this increased efficiency, the coating of ink composition (however thin) is not held too firmly by any interstices of the smooth and compact front surface of the carrier substrate and there is therefore no need to ensure that the indicium-forming material forms a particularly robust and therefore thick coating.

The carrier substrate of a dry transfer system embodying the invention may be a sheet, film, web, strip, tape or ribbon and may be made from a single layer of polymeric material, for example, FEP or a laminate consisting of a base sheet and on at least one surface thereof a coating of a fluorocarbon dispersion which defines the front surface of the carrier substrate. The base sheet may be of paper or a polymeric film. The carrier substrate should be of a material which is dimensionally stable so as to resist stretching, especially during the transfer process. This stability is important because stretching greatly limits accuracy of transfer, increases the risk of accidental release, and may cause breakage of indicia carried thereby. In addition, again for greater accuracy of transfer, it is preferable that the carrier substrate be transparent to enable inspection of the indicium therethrough. By reason of such properties being desired, the base sheet is most preferably a film of a polyester homopolymer or copolymer, for example Melinex (a commercially available polyethylene terephthalate produced by ICI) and is coated on at least one surface thereof with a PTFE dispersion.

A further advantage to be achieved by employing a PTFE dispersion is that the coating thus produced can be used with a wide variety of ink compositions. For example, it is not dissolved by solvents present in most conventional ink compositions.

Preferably, in a dry transfer system embodying the invention when the carrier substrate is a base sheet coated with a fluorocarbon dispersion, both surfaces of the base sheet are coated with the dispersion. In this case, at least a portion of the front surface bears the indicium-forming material and the other surface may serve as a protective layer to prevent accidental transfer of an indicium from another said dry transfer system when placed in face-to-face relation therewith (it being usually unnecessary to subject this other coated surface to a smoothing operation.

The fluorocarbon compound is preferably dispersed in an organic liquid and the dispersion is preferably in non-coagulated form. Commercially available PTFE products which are particularly preferred are Klingerflon (a Trade Mark for a material which has previously been used as a release coating for moulds in the plastics industry) and Vydax AR manufactured by E. I. du Pont de Nemours, a dispersion of PTFE in trichlorotrifluoroethylene ($CCl_2FCClF_2$) and a "Freon" in which at least some of the PTFE is in telomeric form.

The indicium-forming material may be any material which is capable of forming a thin, pliable and extensible film on the carrier substrate and which constitutes a preformed image capable of transfer to a receiving surface. The ink composition of the indicium-forming material need not be specially formulated; many conventional colouring compositions, for example printing inks, paints and some writing inks are capable of forming the thin, pliable and extensible film of indicium-forming material.

In contrast to conventional dry transfer systems the indicium-forming material of a dry transfer system embodying the invention does not take the form of a particularly robust and therefore thick coating; it takes the form of a film which is sufficiently thin, pliable and extensible as to be deformable in conformity with surface irregularities in the receiving surface and so become readily accepted and permanently held by the relatively larger interstices of the receiving surface with which the indicium-forming material forms a mechanical key. Indeed, it is found that, again contrary to conventional dry transfer systems, the thinner the coating of ink composition of a dry transfer system embodying the invention the more efficient the transfer; this is because as mentioned above a thinner coating will more readily be accepted and permanently held by the interstices within the receiving surface thus achieving greater ease of transfer and minimising breakage of indicia during transfer or in subsequent use.

With particularly thin films of indicium-forming material comes the advantage that, in contrast to conventional dry transfer systems, the presence of an adhesive is not required and, in the dry transfer system embodying the invention the indicium-forming material is not more than 10 micrometers in thickness and preferably takes the form of a simple layer consisting of the pliable and extensible film of ink. A preferred thickness is less than 5 micrometers. This contrasts with the conventional dry transfer systems in which the thickness of the indicium-forming material is usually from 15 to 40 micrometers.

The improved bonding between the indicium of smaller thickness and the receiving surface provides a much more permanent and durable image thereon enabling a more robust use of the resultant transferred image; when using especially preferred dry transfer systems embodying the invention, the transferred indicium is so strongly secured by the previously mentioned mechanical key to the receiving surface that a substantial disturbance of the receiving surface (e.g. by hard rubbing) is necessary to remove the indicium.

Such a dry transfer system embodying the invention has the following further advantages:

(1) Since neither the dry transfer system nor the receiving surface need be provided with an adhesive or waxy substance then neither surface need be tacky either before or after transfer. This eliminates the handling and storage problems associated with this tackiness.

(2) Again in contrast to conventional dry transfer systems, since a dry transfer system embodying the invention does not employ a particularly thick coating of ink composition as the indicium-forming material to attain efficient transfer, the amount of material required is reduced.

(3) By elimination of adhesive and reduction in the amounts of materials required there is a considerable saving in cost.

(4) As previously mentioned it is not essential for the ink composition to be specially formulated.

Elimination of the requirement that the ink composition be specially formulated has, of course, quite far-reaching advantages. Thus many types of colouring composition can be used and this greatly increases the practical applications of a dry transfer system embodying the invention. Thus, many colouring compositions can be employed as indicium-forming material, for example, many standard printing inks and certain photocopying inks (the so-called dry and "liquid toners", which form a thin, pliable, extensible film), paints, for example, poster paint, and conventional inks, for example, those used in felt-tip pens.

Since a much wider variety of ink compositions can be employed as indicium-forming materials than in conventional dry transfer systems a much wider variety of methods can be employed for their application to the carrier substrate.

Thus, for example, an image can be applied to the carrier substrate by merely printing (by any of a large number of methods), writing, painting or drawing on it.

When a printing method is employed, this may be carried out by way of the conventional printing techniques, for example, letter-press, gravure or lithographic printing, but an offset printing technique especially a "dry", offset letterpress technique is most preferred since this gives the thinnest layer of ink.

Since certain photo-copying inks can be efficiently transferred, photo-copying provides a very efficient commercial method of producing a dry transfer system embodying the invention, it being necessary merely to pass a plurality of carrier substrates successively through a photo-copying machine supplied with a "liquid toner". Such a dry transfer system thus produced is ready for use.

The layer of indicium-forming material so produced takes the form of a single, thin, pliable and extensible film as previously described and, by applying the methods, described above, the ink composition producing this film is applied directly on to the carrier substrate to define a preformed image thereon. The preformed image is thus applied by a single (e.g. printing or writing) operation and is defined by a single layer of indicium-forming material. Although the ink composition may contain an oil or plasticizer it need not and preferably does not contain an adhesive. Such dry transfer systems differ from conventional dry transfer systems which either have two separate layers of indicium-forming material, one of ink and one of adhesive, or have a single layer of ink and adhesive combined but require image formation by the previously mentioned complicated technique of removing selected regions of ink from a carrier substrate coated entirely with ink.

By the above methods of producing dry transfer systems embodying the invention, the desired image is preformed by the direct application to the carrier substrate of an ink composition. Such a dry transfer system may be placed with the indicium adjacent to a receiving surface, and the entire preformed image on the carrier substrate transferred merely by the application of a burnishing instrument, for example, a writing instrument, to the rear surface of the carrier substrate. By this method of transfer it is possible to attain 100 percent transfer of the ink composition defining the preformed image thereby producing an indicium on the receptor surface with a predetermined opacity and depth of shade. This 100 percent transfer of indicium-forming material is possible because, in such a dry transfer system embodying the invention, the cohesive force of the ink film is greater than the adhesive force bonding the ink film to the carrier substrate.

Dry transfer systems embodying the invention are particularly useful when formation and transfer of an intricate design or a design of accurate dimension is desired. Thus, since only a fine coating of ink composition need be applied, since accurate registration of a subsequent layer of adhesive is not required and since the carrier substrate can conveniently be of a transparent material and is dimensionally stable, then a design of precise dimensions can be easily applied to the carrier substrate and this can thereafter be accurately transferred to a receiving surface.

In strong contrast to this, a further use to which a dry transfer system embodying the invention can be applied is a children's game, it being possible to apply to the carrier substrate many colours of, for example, poster paint which can be transferred at will, by children wishing to construct drawings, this being achievable merely by rubbing or writing on selected areas of the reverse side of the carrier substrate.

A preferred dry transfer system embodying the present invention will now be described in greater detail by way of example with reference to the accompanying drawing, wherein the sole FIGURE is a diagrammatic enlarged cross-sectional view showing the relative dispositions of the various layers in the dry transfer system.

Referring to the drawing, the dry transfer system includes a base sheet comprising a polyester film 2 coated on each side thereof with respective PTFE dispersion layers 4, 5 to define a carrier substrate. One of the PTFE dispersion layers 4 has been buffed and carries a single thin, pliable and extensible film 6 of ink covering a portion thereof, and the other PTFE dispersion layer 5 constitutes a rear surface of the carrier substrate.

The dry transfer system is manufactured by coating both sides of the polyester film 2 with a PTFE dispersion to form the dispersion layers 4, 5 and thus produce a carrier substrate. A typical PTFE dispersion composition is:

200 g Vydax AR (a dispersion of PTFE in a mixture of trichlorotrifluoroethylene $CCl_2FCClF_2$ and a "Freon")

720 g Freon TF (solvent)

80 g acetone (solvent)

Each PTFE dispersion layer 4 may be formed by applying one or two coatings, but howsoever applied, the total thickness of each layer 4, 5 is preferably from 3–5 micrometers, this being sufficient to ensure complete covering of the polyester film with PTFE dispersion and not so thick as to affect the transparency of the carrier substrate. The coatings of PTFE dispersion may be applied using a Mayer equalizing bar, preferably wound with a 100 micrometer diameter stainless steel wire, this giving both the required thickness and degree of smoothness. The coatings are then dried by passing the film through an oven at 50° C. at a rate of 35 ft/min, (10.7 m/min) the oven drying from 15 to 20 ft (4.5 to 6 meters) of film at a time.

In the Vydax AR dispersion at least some of the PTFE 5 is in telomeric form and at least some of the telomer is soluble in the organic solvent mixture. It is believed that on drying of the coated dispersion the dissolved telomer may form a film which acts as a matrix for the remaining solid particles thus increasing the smoothness of the resultant coating.

The dispersion layer 4 is then immediately subjected to a buffing operation using brushes in order to further increase the smoothness by removing any protruding material (which would otherwise present crevices in which the ink composition to be applied would run and be permanently trapped therein, thus preventing transfer or causing tearing of indicia). This buffing operation is carried out after a predetermined time interval has been allowed to elapse from application of the PTFE dispersion to the polyester film 2 during which time interval (from say 25–35 seconds) the coating has become sufficiently hard not to be damaged but is still sufficiently soft to enable removal of the material imparting the undesirable roughness.

A suitable coating of an ink composition is then applied over selected portions of the upper PTFE dispersion layer 4 and this is allowed to dry to form a single pliable and extensible film 6 of ink no more than 5 micrometers thick, which defines a preformed image on the carrier substrate and thus produces a dry transfer system, the preformed image being capable of release therefrom onto a receiving surface. A typical ink composition for application by gravure printing is:

carbon black (colouring component)

ethyl cellulose N22—a commercially available ethyl cellulose (film-forming component)

diisooctyl phthalate (plasticizer)

methyl ethyl ketone (solvent)

Where a particularly intricate design or design of accurate dimensions is to be applied, however, the coating is preferably effected by an offset-printing technique, more preferably offset letterpress, this being because a thinner ink coating can be achieved by this method.

The dry transfer system embodying the invention described above, in which a design having precise dimensions and capable of accurate transfer has been applied, is particularly useful for providing images of components to be displayed in technical literature and, in particular, they may bear architect's plans, engineering drawings or component parts thereof.

In order to effect transfer using the dry transfer system described above it is necessary merely to place it with the film 6 of ink defining the desired preformed image in face-to-face relation with a receiving surface and apply a pressure to the rear surface 5 of the carrier substrate in such a way that forces tending to deform the film 6 of ink and so release it from the carrier substrate and push it into the interstices of the receiving surface to achieve a mechanical key therewith are transmitted through the carrier substrate. This can be achieved by burnishing.

By this method the thin, pliable and extensible film 6 of ink can be transferred efficiently and held permanently by many types of receiving surface, for example, polyester drafting film, tracing paper and conventional paper; unlike conventional dry transfer systems it is not necessary in order to achieve efficient transfer to carefully select a given ink composition as indicium-forming material in dependence on the nature of the receiving surface which is to accept the image.

A plurality of dry transfer systems embodying the invention can be stored until required for use in stacks in which they are placed on top of one another, and can be so stacked without the requirement for interleaves between respective dry transfer systems. With known dry transfer systems, if two or more sheets were placed on top of one another without the interleaf therebetween then if pressure were accidentally applied to the top sheet, transfer would take place from one sheet to the next in the areas where the accidental pressure was applied. Such accidental transfer is satisfactorily prevented when stacking the above mentioned dry transfer systems embodying the invention by the provision of the rear PTFE dispersion layer 5 on the polyester film 2.

I claim:

1. A dry transfer system for transferring indicia to a receiving surface, comprising (a) a flexible carrier substrate having front and rear surfaces and (b) a film of indicium-forming material defining a preformed image and adhering to at least a portion of the front surface of the carrier substrate, characterised in that:

the film of indicium-forming material is cohesive, pliable, capable of plastic deformation, and not more than 10 micrometers in thickness;

the carrier substrate is dimensionally stable, and at least the front surface of the substrate is composed of a material whose surface possesses adhesive properties and is sufficiently smooth, that when no adhesive is present, (A) the carrier substrate is nevertheless capable of releasing the film of indicium-forming material to a receiving surface in close contact therewith on application of a pressure transmitted to deform the film so that this film intimately conforms to the receiving surface and remains transferred thereto; but (B) the carrier substrate is still capable of retaining said indicium-forming material adherent to the front surface of the carrier substrate when in said close contact with the receiving surface in the absence of said pressure.

2. A dry transfer system according to claim 1, wherein the thickness of the film of indicium-forming material is less than 5 microns.

3. A dry transfer system according to claim 1, wherein the film of indicium-forming material is formed from a printing ink composition.

4. A dry transfer system according to claim 3 wherein the printing ink composition is applied by gravure printing technique.

5. A dry transfer system according to claim 3 wherein the printing ink composition is applied by offset letter press.

6. A dry transfer system according to claim 3, wherein the printing ink composition is applied by an offset lithographic printing technique.

7. A dry transfer system according to claim 3, wherein the printing ink composition is a photocopying ink composition capable of forming said film of indicium-forming material.

8. A dry transfer system according to claim 1 wherein the indicium-forming material comprises a photo-copying toner.

9. A dry transfer system according to claim 1 wherein the front surface of the carrier substrate has been smoothed by buffing prior to application of the film of indicium-forming material.

10. A dry transfer system according to claim 1 or 9 wherein the carrier substrate comprises a base sheet at least one surface of which has a coating thereon of a dispersion of a fluorocarbon compound which coating defines the front surface of the carrier substrate.

11. A dry transfer system according to claim 10, wherein the fluorocarbon compound is dispersed in an organic liquid.

12. A dry transfer system according to claim 10, wherein the dispersion is in non-coagulated form.

13. A dry transfer system according to claim 10, wherein the fluorocarbon compound is polymer and/or telomer.

14. A dry transfer system according to claim 13, wherein the polymer and/or telomer contains units derived from tetrafluoroethylene.

15. A dry transfer system according to claim 14, wherein the polymer and/or telomer is a polytetrafluoroethylene homopolymer and/or homotelomer.

16. A dry transfer system according to claim 10, wherein the base sheet has opposed said surfaces each of which is coated with said dispersion, said one coated surface defining said front surface of the carrier substrate and the other coated surface being capable of serving as a protective layer to prevent accidental transfer of an indicium from another dry transfer system when placed in face-to-face relation therewith.

17. A dry transfer system according to claim 1 wherein the carrier substrate includes a base sheet consisting of a film of a polyester homopolymer or copolymer.

18. A dry transfer system comprising a carrier surface and a film of indicium-forming material carried thereby to be deposited on a receptor surface wherein:

the carrier surface is flexible and relatively smooth in comparison with relative irregularity of the receptor surface; and the film of indicium-forming material is cohesive, pliable and capable of plastic deformation being sufficiently thin, not more than 10 microns, so as to conform to said relative irregular receptor surface whereby upon the application of pressure to the carrier surface and the receptor surface with the film of indicium-forming material therebetween, the indicium-forming material will be transferred to the receptor surface as the film intimately conforms to the irregular receptor surface and will remain transferred thereto, without the necessity of the indicium-forming material being tacky on its surface or the necessity of having an adhesive between the film of indicium-forming material and the receptor surface.

19. A method of producing a dry transfer system for transferring indicia to a receiving surface, by applying a film of indicium-forming material defining a preformed image to at least a portion of the front surface of a flexible carrier substrate having front and rear surfaces, characterised by the steps of:

(i) providing a carrier substrate which is dimensionally stable, and at least the front surface of which is composed of a material whose surface possesses abhesive properties and is sufficiently smooth, that when cohesive, pliable and plastically deformable indicium-forming material of a thickness no greater than 10 micrometers has been applied and is adherent thereto, and when no adhesive is present, (A) the carrier substrate is nevertheless capable of releasing the film of indicium-forming material to a receiving surface in close contact therewith on application of a pressure transmitted to deform the film so that this film intimately conforms to the receiving surface and remains transferred thereto, but (B) the carrier substrate is still capable of retaining said indicium-forming material adherent to the front surface of the carrier substrate when in said close contact with the receiving surface in the absence of said pressure; and (ii) applying to at least a portion of said front surface of the carrier substrate a cohesive, pliable, plastically deformable film not more than 10 micrometers thick, of indicium-forming material defining a preformed image.

20. A method according to claim 19, wherein step (i) includes smoothing a front surface of the said substrate by buffing.

21. A method according to claim 19 or 20, wherein step (i) includes coating at least one surface of a base sheet material with a dispersion of a fluorocarbon compound.

22. A method according to claim 21, wherein front and rear surfaces of the base sheet are coated with the dispersion.

23. A method according to claims 19 or 20, wherein step (ii) is carried out by applying an ink composition to the front surface.

24. A method according to claim 19 wherein step (ii) is carried out by printing on to the front surface.

25. A method according to claim 24, wherein the printing is carried out by passing the carrier substrate through a photo-copying machine to deposit thereon an image formed by a photo-copying ink composition.

26. A dry transfer process in which indicium-forming material is transferred from a relatively smooth flexible carrier substrate to a relatively irregular receiving surface of a receptor material as comprised by the steps of:

preparing the indicium-forming material to be cohesive, pliable, and plastically deformable and to have sufficient thinness so as to be capable of conforming to said relatively irregular receiving surface;

adhering the indicium material to a smooth transfer surface of the flexible carrier substrate; and, subjecting the indicium material to pressure between the flexible carrier substrate and the receiving surface to deform the indicium-forming material into conformity with the irregular receiving surface thereby causing the indicium-forming material to bond to the receiving surface and to release from the relatively smooth flexible carrier substrate.

* * * * *